INVENTOR
CHARLES G. DEN HERTOG
BY
Frank R. Trifari
AGENT

ALL ORDINATES ARE
SIGNAL AMPLITUDES

INVENTOR.
CHARLES G. DEN HERTOG
BY
Frank R. Trifari
AGENT 3,343,090
RECEIVING DEVICE FOR PULSES MODULATED BY PHASE JUMP MODULATION ON A CARRIER OSCILLATION Charles Govert den Hertog, Hilversum, Netherlands, assignor to North American Philips Company, Inc., New York, N.Y., a corporation of Delaware Filed Apr. 13, 1964, Ser. No. 359,328
Claims priority, application Netherlands, Apr. 16, 1963, 291,584
5 Claims. (Cl. 325—320)

ABSTRACT OF THE DISCLOSURE

A receiver for phase-shift modulated signals transmitted with pilot oscillations, comprising means for generating two timing signals having a recurrence frequency equal to the difference between the pilot and carrier and having a mutual phase difference of one half a period. A coincidence circuit is provided for detecting a difference in phase between the regenerated carrier and the carrier of the signals, and the coincidence circuit controls which of the timing signals is employed in the regeneration of the synchronously demodulated signals.

The invention relates to a receiving device for pulses modulated by phase jump modulation on a carrier oscillation, the instants of occurring of said pulses coinciding with a sequence of equidistant timing pulses, said device comprising a correction member for correcting shifts in the pulse instants occurring on the transmission path by means of a pilot oscillation transmitted with the modulated carrier oscillation, the difference frequency of said pilot oscillation from the carrier oscillation being equal to the repetition frequency of the timing pulses.

Such receiving devices are employed in data transmission systems. In such systems, in which a pulse is characterized by a given phase of the carrier oscillation, it is necessary to know unambiguously the phase of the carrier oscillation at the receiver end. With known methods for restoring the carrier oscillation from the modulated carrier oscillation the restored carrier oscillation has two possible phase positions shifted by 180° relatively to each other.

The invention has for its object to provide a receiving device of the kind set forth, in which both in the one and in the other possible phase position of the carrier oscillation an unambiguous pulse reception is ensured.

The receiving device according to the invention is characterized in that there is provided a phase reversing member which converts the demodulated pilot oscillation into two timing oscillations having a relative phase difference of half a period and having the same frequency as the demodulated pilot oscillation, one oscillation being fed to the correction member, whilst there is furthermore provided a limiter, which converts the modulated carrier oscillation subsequent to synchronous demodulation into an alternating voltage of constant amplitude, the zero passages of which coincide with the zero passages of one of the two timing oscillations and in that there is furthermore provided a coincidence detector which responds at the coincidence of a zero passage of the square-wave alternating voltage and a zero passage of the timing oscillation fed at that instant to the correction member, there being a change-over member which feeds the other timing oscillation to the correction member, when the coincidence detector responds, there being furthermore provided a commutation member which inverts the polarity of the corrected pulses at the output of the correction member simultaneously with the change-over from one timing oscillation to the other.

The invention will now be described more fully with reference to an embodiment shown in the drawing.

Figure 1:
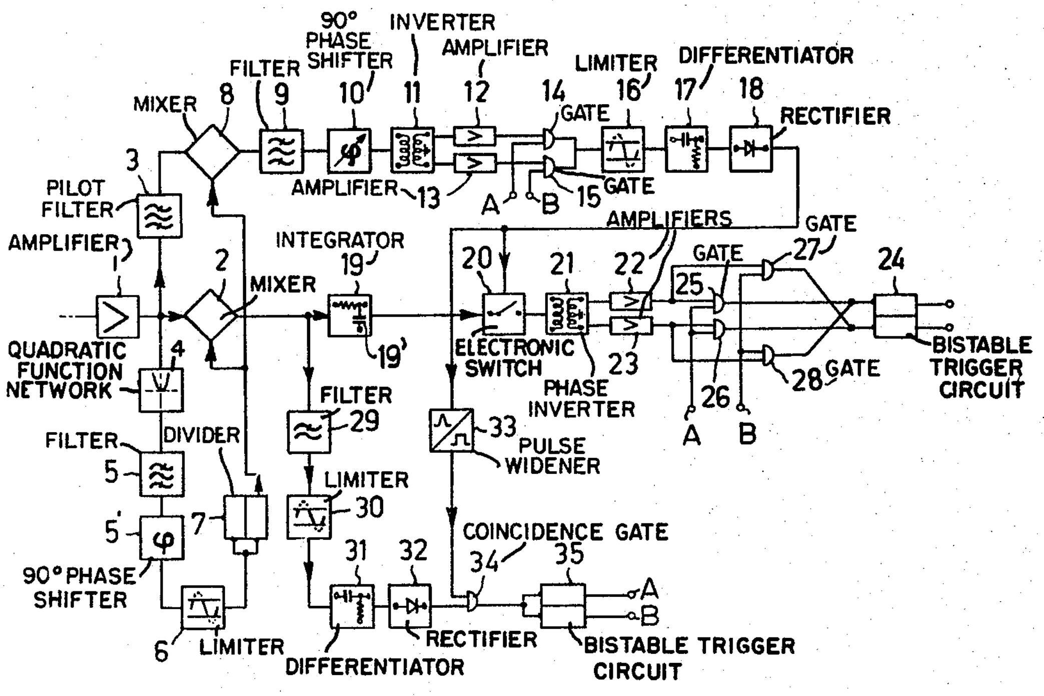
FIG. 1 shows an embodiment of a receiving device according to the invention.

The receiving device shown in FIG. 1 forms part of a receiving station in an intelligence transmission system. The intelligence is formed at the transmitter end by information pulses, the instants of occurrence of which coincide with a sequence of equidistant timing pulses. The pulse duration is equal to the period of time between two timing pulses, so that an information pulse assumes the form of a mark element and no information pulse assumes the form of a space element. The signalling rate amounts in this embodiment to 1000 Baud, which means that 1000 elements per second are transmitted, so that the duration of one element is 1 msec. The mark elements and the space elements are modulated at the transmitter end by phase jump modulation on a carrier oscillation of 1500 c./s. With this modulation method a space element reverses the phase of the carrier oscillation and a mark element leaves the carrier oscillation in its initial phase. For illustration FIG. 2*a* shows part of the transmitted sequence of mark and space elements. The mark elements are designated by M and the space elements by S. The carrier oscillation of 1500 c./s. is illustrated in FIG. 2*b* and FIG. 2*c* shows the sequence of mark and space elements of FIG. 2*a*, modulating the carrier oscillation. The starting instants of the mark and space elements coincide with a sequence of equidistant timing pulses, the repetition frequency of which is 1000 c./s. These timing pulses coincide with the zero passages of an alternating voltage of 500 c./s., which is illustrated in FIG. 2*d*. This 500 c./s. timing oscillation is at the same time used as a pilot oscillation and is transmitted together with the modulated carrier oscillation of 1500 c./s. The frequency difference between the pilot oscillation and the carrier oscillation is equal to the timing frequency of 1000 c./s., which frequency difference is maintained, when in the transmission via carrier frequency connections frequency shifts of the transmitted oscillations occur. The modulated carrier oscillation shown in FIG. 2*c* and the pilot oscillation are transmitted, for example, via a telephone connection having a frequency range from 300 to 3400 c./s., whilst the frequency components lying beyond the frequency range are cut off by means of a filter. In order to ensure a fixed phase relationship between the carrier oscillation and the pilot oscillation the carrier oscillation is derived from the pilot oscillation by frequency multiplication.

At the receiver end there is received a pilot oscillation of 500 c./s. and a phase-modulated carrier oscillation of 1500 c./s. The waveform of the incoming signal, apart from distortions due to the restricted band width of the telephone connection, is illustrated in FIG. 2*e*. For the sake of clarity this figure shows the pilot oscillation in broken lines.

The incoming signal oscillations are fed via an amplifier 1 having automatic gain control to the input of a multiplicative mixing stage 2, to the input of a pilot filter 3 and to the input of a network 4 having a quadratic transmission characteristic curve, for example a fullwave rectifier. The fullwave rectifier 4 forms part of a circuit for restoring the carrier oscillation from the modulated carrier oscillation. This circuit comprises furthermore, in order of succession, a filter 5, tuned to double the carrier frequency, a 90° phase shifting network 5', an amplitude limiter 6 and a divide-by-two member 7. The network 4 multiplies the incoming signal by two, so that at the output a 3000 c./s. oscillation is produced, the phase of which is determined by the phase of the carrier oscillation. This oscillation is filtered out by the filter 5, tuned to 3000 c./s. and fed via a 90° phase shifting network 5' to the limiter 6. The limiter 6 converts the 3000 c./s. oscillation into a square-wave alternating voltage, the negative-going flanks of which change over a bistable trigger circuit 7, connected as a divide-by-two member. At the output of the member 7 there is thus produced the square-wave alternating voltage of FIG. 2*f*, having a fundamental frequency equal to the carrier frequency of said oscillation being in phase with the modulated carrier oscillation. This square-wave carrier oscillation is fed to the mixing stage 2, for example a switch-demodulator for synchronous demodulation of the modulated carrier oscillation. By demodulation of the modulated carrier oscillation the output of the mixing stage 2 has produced at it a demodulated signal the waveform of which is illustrated in FIG. 2*g*. At the output of the mixing stage 2 there also occurs the demodulated pilot oscillation. This oscillation, however, has a frequency of 1000 c./s. and is filtered out in the further processing of the demodulated signal.

The pilot oscillation of 500 c./s. allowed to pass the pilot filter 3 is mixed in the mixing stage 8 with the carrier oscillation supplied by the divide-by-two member 7. The 1000 c./s. filter 9, connected to the output of the mixing stage 8, filters from the mixed product the 1000 c./s. componentt and supplies the same via a 90° phase-shifting network 10 and a member 11–15, to be described hereinafter, to a limiter 16. At the output of the phase-shifting network 10 there is produced the 1000 c./s. oscillation shown in FIG. 2*h* by a full line, the zero passages with the positive-going flanks of which coincide with the ends of the elements in the demodulated signal. Any phase differences can be corrected by providing a variable phase-shifting network 10. The limiter 16 converts the 1000 c./s. oscillation into a square-wave alternating voltage and supplies the latter to a differentiator 17. After differentiation by the differentiator 17 and rectification by the halfwave rectifier 18 the output of the rectifier 18 has produced at it the sequence of timing pulses shown in FIG. 2*j*, having a timing frequency of 1000 c./s. With the aid of this sequence of timing pulses derived from the pilot oscillation the time shifts occuring on the transmission path are corrected. The correction member performing the correction of the demodulated signal comprises an integrating network 19 comprising an integration capacitor 19', which integrates the demodulated signal each time for the duration of one element, the charge thus accumulated in the integration capacitor being fed via an electronic switch 20, controlled by the timing pulses, during a timing pulse via the input of a phase-inverting stage 21. The charge of the integration capacitor at the discharge instant is positive or negative in accordance with the type of element, so that the discharge current pulse is positive or negative. The phase inverting stage converts a pulse at the input into two pulses of opposite polarity and supplies the same to two different pulse amplifiers 22 and 23, which amplify the positive pulses and block the negative pulses. A mark element thus produces a positive pulse at the output of one amplifier and a space element produces a positive pulse at the output of the other amplifier, which amplifier outputs are connected via a member 25–28 to be described hereinafter to different trigger inputs of a bistable trigger circuit 24. A pulse at a trigger input puts the trigger circuit in a given state corresponding with this input, so that at the output of the trigger circuit an information signal is produced, which has square-wave mark and space elements, the duration of which elements is determined by the duration of the interval between two timing pulses. The waveform occuring at the output of the trigger circuit 24 is illustrated in FIG. 2*k*. As a result of the integrating scanning of each element the regenerated space and mark elements are shifted for the duration of one element with respect to the corresponding elements in the modulated signal illustrated in FIG. 2*g*.

A mark element corresponds to a given phase of the carrier oscillation and a space element corresponds to the opposite phase so that for an umambiguous determination of the type of element the phase of the carrier oscillation must be known. With the method described above for restoring the non-modulated carrier oscillation from the modulated carrier oscillation, like with other known methods, the restored carrier oscillation has two potential phase positions, which are shifted in phase through 180° relatively to each other. At the beginning of the service the phase of the restored carrier oscillation can be put once to the correct phase position, for example by starting the service by emitting only mark elements so that at the receiver end it can be derived from the state of the trigger circuit 24 whether the carrier oscillation has the correct phase position or not. This possibility does not exist, if during the transmission of intelligence, due to a disturbance of the transmission path, the carrier oscillation gets into the wrong position.

In the receiving device shown in FIG. 1 there is provided a member for determining the phase position of the restored carrier oscillation by comparing the phase of the timing pulses with the phase of the zero passages of the demodulated signal. The demodulated signal is delayed in this case for the duration of half an element so that a zero passage of the delayed demodulated signal always lies midway between two timing pulses, when the carrier oscillation has the correct phase position. If the carrier oscillation is in the wrong phase position, the polarity of the demodulated pilot oscillation is reversed, so that the timing pulses derived therefrom are shifted for half a period. The timing pulses then occupy a position which coincides with the centre of the elements of the demodulated signal, so that the scanning result becomes quite unreliable. In the wrong position of the carrier oscillation a zero passage of the delayed demodulated signal coincides with a timing pulse.

The determination of the phase position of the carrier oscillation is performed in the receiving device shown as follows. The demodulated signal, the waveform of which is illustrated in FIG. 2*g*, is fed via a low pass filter 29 having a cut-off frequency of about 500 c./s. and a delay period of ½ msec. to a limiter 30. The waveform of the demodulated signal at the output of the filter 29 is illustrated in FIG. 2*m* and FIG. 2*n* illustrates the waveform at the output of the limiter 30. The square-wave output signal of the limiter 30 is differentiated in the differentiator 31 and then rectified by the fullwave rectifier 32. At the output of the rectifier 32 there is produced a positive pulse for each zero passage of the delayed, demodulated signal. The pulses occurring at the output of the rectifier 32 are illustrated in FIG. 2*p*. The phase position of these pulses is, owing to the fixed delay of ½ msec. such that each of these pulses lies midway between two timing pulses, when the carrier oscillation is in the correct phase position. If the carrier oscillation is in the wrong phase position, an output pulse of the rectifier 32 coincides with a timing pulse. As a result of noise and interferences there occur time shifts in the zero passages of the demodulated signal, so-called jitter. In order to state with certainty, in spite of the said phenomenon the coincidence of a pulse corresponding to a zero passage of the delayed demodulated signal with a timing pulse, the timing pulses are converted by means of the pulse widener 33 into pulses having a slightly longer duration. The output pulses of the pulse widener 33 are illustrated in FIG. 2*q*. The output of the pulse widener 33 and the output of the rectifier 32 are connected to different inputs of a coincidence gate 34, which supplies a pulse, when the pulses coincide at the two inputs, to a bistable trigger circuit 35, connected as a divide-by-two member, said pulse changing over the trigger circuit from the stable state occupied at said instant into the other stable state.

As soon as it has been assessed that the carrier oscillation is in the wrong phase position, the timing pulses are shifted in phase over half a period. To this end the phase shifting network 10 and the limiter 16 have arranged between them a member which converts the demodulated pilot oscillation into two 1000 c./s. oscillations, which have a phase shift of 180°, whilst one 1000 c./s. oscillation or the other is selected in accordance with the position of the trigger circuit 35. This selection member comprises a phase-inverting stage 11, which converts the 1000 c./s. oscillation at the output of the phase-shifting network 10 into two 1000 c./s. oscillations of opposite polarity, which thus have a phase shift of 180°, which 1000 c./s. oscillations are supplied to two different amplifiers 12 and 13. By means of the gates 14 and 15, the control-terminals A and B are connected to corresponding outputs of the trigger circuit 35, one or the other 1000 c./s. oscillation is supplied to the limiter 16 in accordance with the position of the trigger circuit 35. The selected 1000 c./s. oscillation is illustrated in FIG. 2*h* by a full line, whereas the other 1000 c./s. oscillation is indicated by a broken line. The timing pulses corresponding to the non-selected 1000 c./s. oscillation are illustrated in FIG. 2*r* in broken lines.

When the state of the trigger circuit 35 changes, the 1000 c./s. oscillation having a phase shift of 180°, instead of the 1000 c./s. oscillation supplied up to this instant to the limiter 16, is supplied, so that the timing pulses at the output of the rectifier 18 are shifted over 180° or half a period. The timing pulses of the new sequence of timing pulses which is shifted over the duration of half an element with respect to the initial sequence of timing pulses, have the correct position relative to the elements in the demodulated signal, so that each element is again scanned at its end.

The restored carrier oscillation still occupies the wrong phase position, but the shift resulting from the wrong phase position of the sequence of timing pulses is neutralised by switching over to another sequence of timing pulses shifted over the duration of half an element. As a result of the wrong phase position of the carrier oscillation mark elements are interpreted as being space elements and conversely, so that the demodulated signal has the wrong polarity. At the output of the trigger circuit 24 then space elements would be regenerated instead of mark elements and mark elements instead of space elements, or in other terms, the information would be inverted. In order to neutralise this inversion of the information, the outputs of the amplifier 22 and the amplifier 23 and the trigger inputs of the trigger circuit 24 have arranged between them a commutation member, which interconnects, in accordance with the state of the trigger circuit 35, the outputs of the amplifiers 22 and 23 and the trigger inputs of the trigger circuit 24 directly via the gates 25 and 26 or cross-wise via the gates 27 and 28. The common control-terminal A or B of the gates 25 and 26 respectively, 27 and 28 respectively is connected to the corresponding output terminal of the trigger circuit 35. When the state of the trigger circuit 35 changes, the output pulse of the amplifier 22 or 23 is supplied to another trigger input of the trigger circuit 24 than prior to the change-over instant. A mark element of the demodulated signal is thus regenerated in the form of a space element and conversely, so that at the output of the trigger circuit 24 the correct information appears.

It should be noted that the phase position of the restored carrier oscillation has not changed, but that by the obviation of all consequences of the variation of the phase position of the carrier oscillation the phase position occupied by the carrier oscillation can be considered now to be the correct phase position.

The change-over from one timing pulse sequence to the other timing pulse sequence and the conversion of the polarity of the regenerated elements are immediately performed after the wrong phase position of the carrier oscillation has been assessed. This is particularly advantageous, since then the number of elements received erroneously, is minimized.

Figure 2:
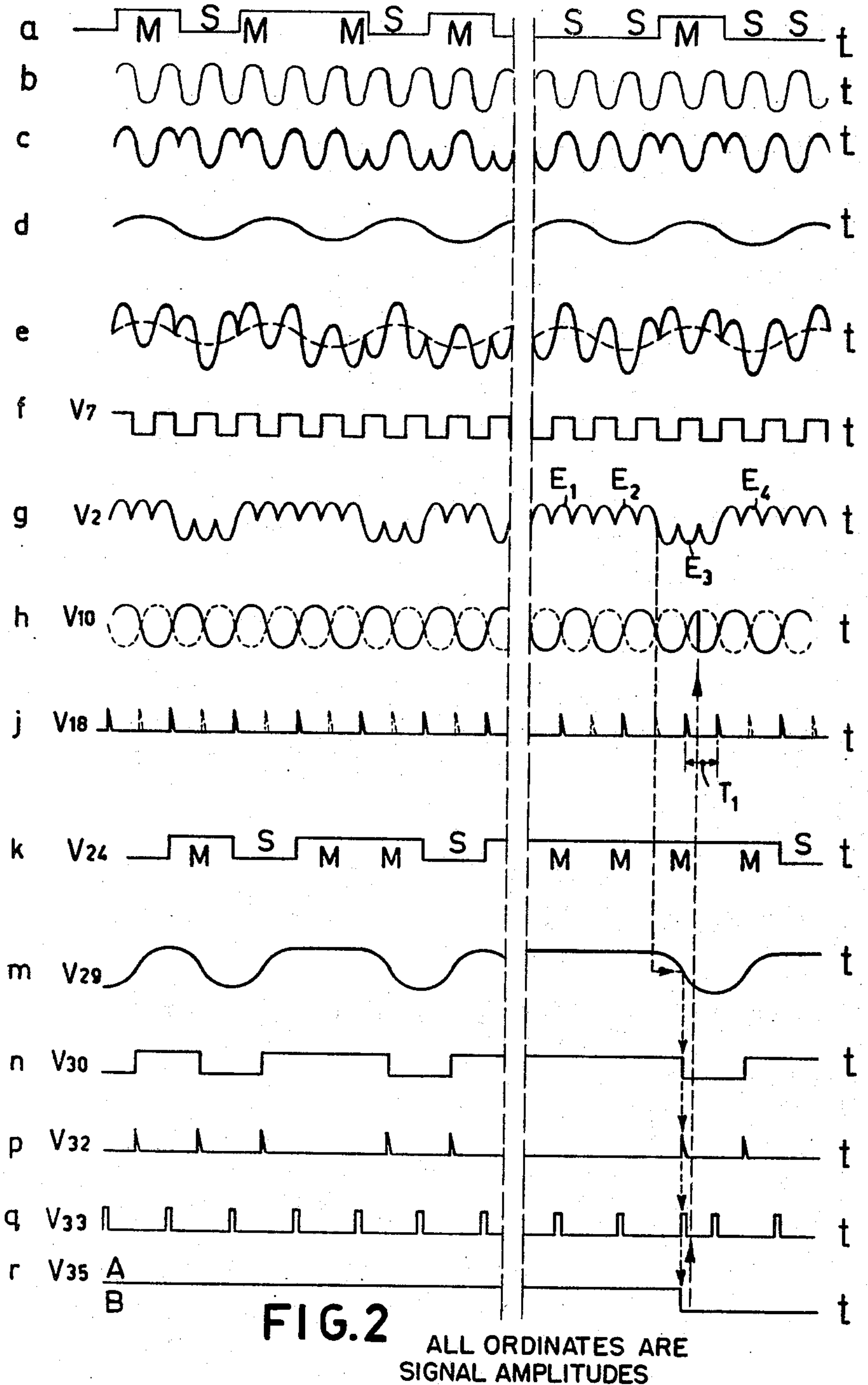
FIG. 2 shows a few waveforms for explaining the operation of the receiving device shown in FIG. 1.

In the right-hand part of FIG. 2 there are illustrated the waveforms occurring when the carrier oscillation is in the wrong phase position. FIGS. 2*a* to 2*e* are not changed. In FIG. 2*f* the square-wave carrier oscillation is illustrated, which is in the wrong phase position, which will appear from a comparison with the carrier oscillation shown in FIG. 2*b*. The modulated signal has the waveform shown in FIG. 2*g* and thus has the wrong polarity. The 1000 c./s. oscillation obtained by mixing the carrier oscillation and the pilot oscillation and shown in FIG. 2*h* by a full line, also has the inverse polarity and the timing pulses derived from this timing oscillation, and shown in FIG. 2*j*, coincide with the centres of the elements of the demodulated signal. The first two elements of the demodulated signal, designated by $E_1$ and $E_2$ respectively, are positive elements, so that between the centre of the element $E_1$ and the centre of the consecutive element $E_2$ the charge accumulated on the integration capacitor 19' is positive and the trigger circuit 24 is put into the state corresponding to a mark element, which is indicated in FIG. 2*k*, which illustrates the waveform at the output of the trigger circuit 24. In the demodulated signal a zero passage occurs between the positive element $E_2$ and the consecutive negative element $E_3$, said zero passage producing, with a delay of ½ msec. the pulse illustrated in FIG. 2*p*, which coincides with a prolonged timing pulse illustrated in FIG. 2*q*. As a result of the coincidence of the two pulses the trigger circuit 35 is changed over. The trigger circuit 35 is, for example, initially in the state in which the output terminal A is at control-potential and then changes over to the state in which the output terminal B is at control-potential, which is illustrated in FIG. 2*r*. The trigger circuit 35 then selects the 1000 c./s. oscillation indicated in FIG. 2*h* by a broken line. It will appear from FIG. 2*j* that at the change-over from one timing pulse sequence to the other timing pulse sequence two timing pulses are fed to the switch 20 with a time delay indicated by $T_1$ of ½ msec. The first of these timing pulses coincides with the centre of the negative element $E_3$ of the demodulated signal, so that the charge accumulated at this instant on the integration capacitor 19' is substantially zero and the trigger circuit 24 remains in the state occupied at said instant. The timing pulse occurring after a time interval $T_1$ of ½ msec. coincides with the end of the same negative element $E_3$. The charge accumulated on the integration capacitor 19' between the centre of this element to the end thereof may, under certain conditions, be sufficient to produce the change-over of the trigger circuit 24, but it may also be below the required threshold value. The commutation member 25–28 has in the meantime been changed over by the trigger circuit 35, so that the trigger circuit 24 maintains, in both cases, the position occupied at said instant also after this instant. The next timing pulse occurs at the end of the positive element $E_4$ next to the negative element $E_3$, at which instant the trigger circuit 24 is changed over to the state corresponding to a space element. From this element the receiving device operates completely in the same manner as if the carrier oscillation were in the correct phase position.

In the receiving device described above it is avoided that at the correction of the wrong phase position the carrier oscillation is changed over from one phase position to the other. Thus at this correction no phase jump occurs in the demodulated pilot oscillation at the output of the mixing stage 8. Therefore, the filter 9 may have a very high quality, which results in a pilot channel not sensitive to interferences and in a very stable timing oscillation.

What is claimed is:

1. A receiver for signals of the type including a phase-shift modulated carrier oscillation and a pilot oscillation, comprising means for producing a reference oscillation of the frequency of said carrier oscillation, means for synchronously demodulating said signals with said reference oscillations, means for regenerating the modulation of said carrier oscillation from the output of said synchronous demodulating means, means for generating a timing signal from said pilot oscillation, said timing signal having a repetition frequency equal to the difference frequency between said pilot oscillation and carrier oscillation, and means for applying said timing signal to said regenerating means for correcting for shifts occurring in said signals during transmission; wherein the improvement comprises limiter means, means for applying a portion of the output of said synchronous demodulating means to said limiting means to produce an alternating voltage of constant amplitude, coincidence means for comparing said timing signal with the zero crossovers of said constant amplitude alternating voltage, said means for generating a timing signal comprising means for changing the phase of said timing signal by half a period thereof, means for applying the output of said coincidence means to said means for changing said phase, whereby the phase of said timing signal is changed when said reference oscillation is not in phase with said carrier oscillation, said regenerating means comprising means for selectively inverting the output of said regenerating means, and means for applying the output of said coincidence means to said inverting means for inverting the output of said regenerating means when said reference signal is not in phase with said carrier oscillation.

2. A receiver for receiving signals of the type including a carrier that is phase-shift modulated by a pulsatory signal, and a pilot oscillation, comprising a source of said signals to be received, first, second and third channels, means connecting said source to said first, second and third channels, said first channel comprising means for producing a reference oscillation of said carrier frequency, said second channel comprising means for mixing said pilot oscillation and reference oscillation to produce an oscillation of the difference frequency thereof, and means connected to the output of said mixing means for producing first and second timing signals of said difference frequency and having a phase difference of half a period of said difference frequency, said third channel comprising synchronous demodulator means for demodulating said received signals with said reference oscillations, and pulse regenerating means for regenerating said pulsatory signal from the output of said synchronous demodulator means, said regenerating means comprising means for selectively inverting the output of said third channel, said receiver further comprising gate means for selectively applying one of said first and second timing signals to said regenerating means for correcting for shifts of the pulse instants of said signals during transmission, means for generating a constant amplitude alternating signal from the output of said synchronous demodulator means and having zero cross-overs which coincide with the zero crossovers of one of said first and second timing signals, coincidence circuit means for comparing the zero cross-overs of said alternating signal with the zero cross-overs of one of said timing signals to produce a control voltage when said reference oscillation is out of phase with said carrier oscillation, means applying said control voltage to said gate means for changing the timing signal applied to said regenerating means, and means applying said control voltage to said inverting means for inverting the output of said third channel.

3. The receiver of claim 2 in which said first channel comprises network means having a quadratic transmission characteristic for doubling the frequency of oscillations applied to the input of said third channel, limiting means for limiting the output of said network means, and dividing means for dividing the frequency of the output of said limiting means to produce said reference oscillations.

4. The receiver of claim 2 in which said gate means comprises first and second gates each having an input, output and control terminal, means applying said first and second timing signals to the input terminals of said first and second gates respectively, means applying said control voltage to the control terminals of said first and second gates, common limiter means connected to the output terminals of said first and second gates, and differentiating means connected to the output of said limiter means for producing a pulsatory signal output responsive to a change in polarity of the output of said limiter means in one direction, and means applying said pulsatory signal output to said regenerating means and coincidence means.

5. The receiver of claim 2 in which said means for generating a constant amplitude signal comprises limiter means for limiting a portion of the output of said synchronous demodulator means, and said coincidence means comprises a coincidence gate, means for differentiating the output of said limiter means, means applying the output of said differentiating means to one input of said coincidence gate, and said gate means in said second channel comprises differentiating means for producing a pulsatory signal output corresponding to said one timing signal, and means applying said pulsatory signal output to the second input of said coincidence gate.

References Cited

UNITED STATES PATENTS

| | | | |
|---|---|---|---|
| 2,979,566 | 4/1961 | Hopner et al. | 178—67 |
| 3,144,608 | 8/1964 | Warring | 178—66 X |
| 3,155,773 | 11/1964 | Robin et al. | 178—88 X |

JOHN W. CALDWELL, *Acting Primary Examiner.*

J. T. STRATMAN, *Assistant Examiner.*